(No Model.)
C. L. BAGGETT.
PLOW.
No. 485,732.  Patented Nov. 8, 1892.
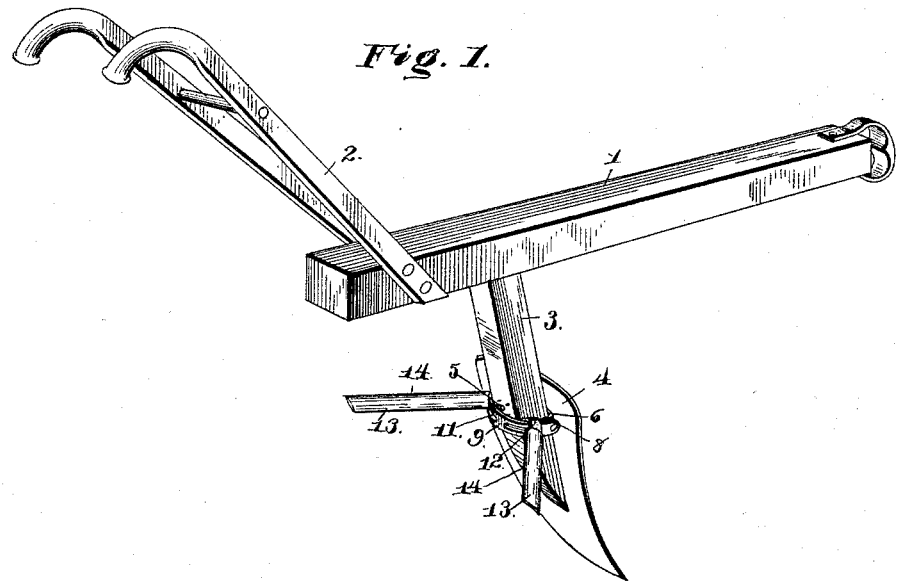
Fig. 1.
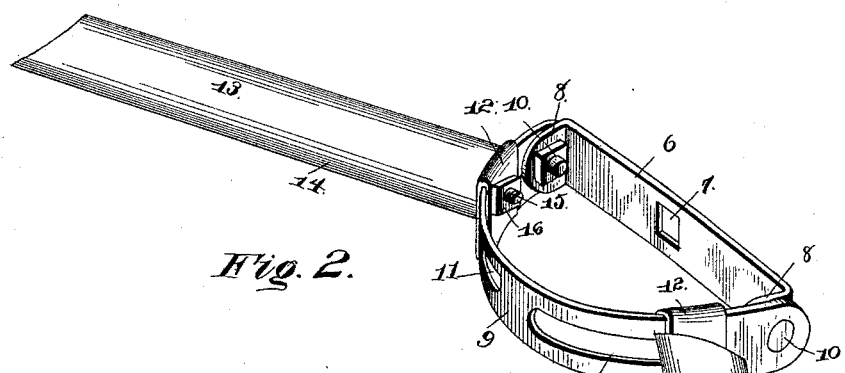
Fig. 2.
Fig. 3.
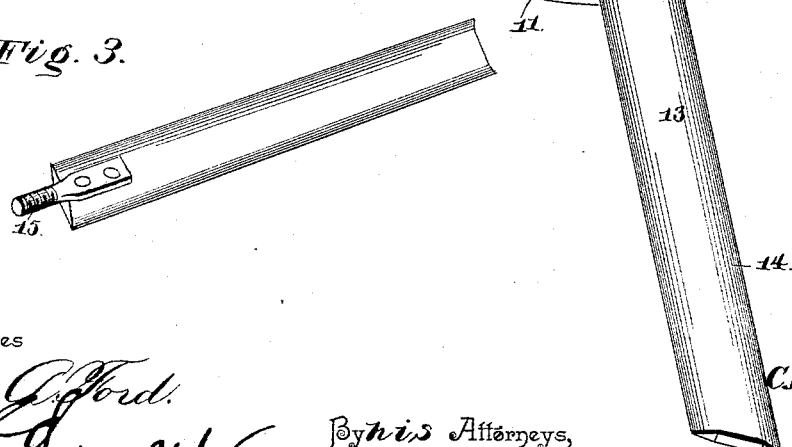
Witnesses
Chas. G. Ford.
J. W. Giggers
By his Attorneys,
C. A. Snow & Co.
Inventor
C. L. Baggett.

UNITED STATES PATENT OFFICE.

CHARLES L. BAGGETT, OF BLUE BRANCH, TEXAS.

PLOW.

SPECIFICATION forming part of Letters Patent No. 485,732, dated November 8, 1892.

Application filed February 4, 1892. Serial No. 420,325. (No model.)

*To all whom it may concern:*

Be it known that I, CHARLES L. BAGGETT, a citizen of the United States, residing at Blue Branch, in the county of Bastrop and State of Texas, have invented a new and useful Plow, of which the following is a specification.

This invention relates to improvements in plows, and has special reference to attachments for the same.

The objects of my invention are to provide an attachment for an ordinary shovel plow or cultivator, whereby it may be converted into a sweep-plow, adapted to be operated between rows of growing crops and capable of being adjusted in width in accordance with the distances apart of said rows.

Other objects and advantages of the invention will appear in the following description, and the novel features thereof will be particularly pointed out in the claims.

Referring to the drawings, Figure 1 is a perspective of an ordinary shovel-plow, showing my attachments mounted in position thereon. Fig. 2 is a detail in perspective of the attachment. Fig. 3 is a detail in perspective of one of the blades or wings of the attachment.

Like numerals of reference indicate like parts in all the figures of the drawings.

1 designates the plow stock or beam, 2 the handles, 3 the standard, 4 the shovel, and 5 the heel-bolt that secures the shovel to the standard, such elements being of the ordinary construction.

The attachment comprises a band which encircles the standard 3 of the plow and is detachable from the same. In constructing this band the same is formed of strap-iron, and consists of the front transverse portion or bar 6, provided at its center with a bolt-opening 7 and having its extremities rearwardly-bent to form ears 8. To these ears are bolted the ends of a semicircular strap 9, the bolts 10 passing through the ears and front ends or terminals of the said strap.

At opposite sides of its center the strap is provided with longitudinal slots 11, and its upper edge is embraced by a pair of inverted-U-shaped clips 12. These clips are mounted for movement upon the semicircular strap 9, and in line with the slots 11 the clips have their terminals perforated. 13 designates a pair of wings or blades, which may be made of any desired length, are preferably narrow, and have their opposite longitudinal edges reduced to form cutting-edges 14. These blades are provided at their inner ends with reduced threaded tenons 15, and the same pass through the perforated clips 12 and hence through the slots 11 and at their inner ends are provided with ordinary nuts or taps 16. It will be readily obvious that the wings or blades 13 may be, through the medium of the nuts and clips, clamped upon the curved strap 9 at any point, and that the latter being curved will thus support the blades at any distance apart within a radius prescribed by them. Furthermore, that the said wings or blades may be given any lateral inclination, so as to present their front cutting-edges at any incline with relation to the surface of the ground, thus adapting them to run deep or shallow, as may be desired. By the adjustment of the wings or blades upon the curved strap 9 they may be arranged with accordance to the width or space between the rows of plants.

In use the shovel 4 is removed to admit of the attachment being placed in position upon the foot or standard 3, and when in such a position the front transverse strap 6 passes in front of the foot or standard 3, while the rear semicircular strap 9 encircles the sides and rear part of the standard. It now simply remains to replace the shovel, the same, together with the standard and the attachment, all being secured in position by the heel-bolt 5, which passes through the perforation 7, heretofore mentioned. If desired, I may provide only one edge of the blades or wings with a cutting-edge, or, as herein shown and as preferred, both edges may be thus provided. In the preferred construction it will be seen that I gain a twofold advantage in that not only am I provided with a reversible blade, whereby either edge may be used and the necessity of frequent sharpening decreased, but, inasmuch as the opposite sides of the blades are convex, as the front edges do the cutting the rear edges will become sharpened.

Having thus described my invention, what I claim is—

1. The herein-described sweep attachment for plows, the same consisting of a band adapted to be secured to the plow-stock and having a rear curved slotted portion, clips mounted upon the band, and blades terminating at their front ends in tenons passed through the clips and slots of the band and provided with nuts, substantially as specified.

2. The herein-described sweep attachment for plows, the same consisting of a band having a rear semicircular portion, a pair of blades having their opposite faces convexed and their longitudinal edges reduced to form cutting-edges, said blades being adapted to be reversed, and means for attaching them to the band in an adjustable manner, substantially as specified.

3. The herein-described plow attachment, the same consisting of a band having a rear curved strap portion, a pair of blades radiating from the band and axially connected thereto and adapted to rotate, and means for securing the blades at any point of rotation, substantially as specified.

4. The combination, with the plow-standard, the shovel, and the heel-bolt, of the transverse strap 6, having the heel-bolt opening 7 and the semicircular rear strap 9, the same constituting a band for encircling the standard, the rear strap being provided at opposite sides of its center with the slots 11, the pair of perforated inverted-U-shaped clips 12, mounted on the strap 9, the opposite double-edge wings or blades 13, terminating at their inner ends in the reduced tenons 15, and the nuts 16, mounted thereon, substantially as specified.

In testimony that I claim the foregoing as my own I have hereto affixed my signature in the presence of two witnesses.

CHARLES L. BAGGETT.

Witnesses:
  W. T. SMITH,
  T. J. HARRISON.